(12) United States Patent
Yang

(10) Patent No.: US 10,895,776 B2
(45) Date of Patent: Jan. 19, 2021

(54) LIQUID CRYSTAL PANEL AND MANUFACTURING METHOD FOR THE SAME

(71) Applicant: Wuhan China Star Optoelectronics Technology Co., Ltd., Hubei (CN)

(72) Inventor: Yong Yang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 344 days.

(21) Appl. No.: 16/074,527

(22) PCT Filed: Apr. 24, 2018

(86) PCT No.: PCT/CN2018/084150
§ 371 (c)(1),
(2) Date: Aug. 1, 2018

(87) PCT Pub. No.: WO2019/184034
PCT Pub. Date: Oct. 3, 2019

(65) Prior Publication Data
US 2020/0355959 A1   Nov. 12, 2020

(30) Foreign Application Priority Data
Mar. 29, 2018   (CN) .......................... 2018 1 0273077

(51) Int. Cl.
*G02F 1/1335*   (2006.01)
*G02F 1/1341*   (2006.01)

(52) U.S. Cl.
CPC ...... *G02F 1/133528* (2013.01); *G02F 1/1341* (2013.01); *G02F 1/133514* (2013.01);
(Continued)

(58) Field of Classification Search
CPC .................................................. G02F 1/133528
See application file for complete search history.

(56) References Cited

U.S. PATENT DOCUMENTS

2004/0218121 A1* 11/2004 Zhuang ............. G02F 1/133555
349/114
2018/0067348 A1* 3/2018 Hatanaka ................. G02B 5/30
(Continued)

FOREIGN PATENT DOCUMENTS

CN   1542524        11/2004
CN   102460282 A    5/2012
(Continued)

*Primary Examiner* — Sang V Nguyen
(74) *Attorney, Agent, or Firm* — Leong C. Lei

(57) ABSTRACT

A liquid crystal panel is disclosed. The panel includes: an array substrate, a color filter substrate, a liquid crystal layer, an internal polarizer, and an external polarizer, wherein the array substrate and the color filter substrate are aligned and assembled, and the liquid crystal layer and the internal polarizer are overlapped between the array substrate and the color filter substrate; and wherein the external polarizer is disposed on a side of the color filter substrate away from the array substrate. A manufacturing method for the same is also disclosed. Because the internal polarizer is disposed between the color filter substrate and the array substrate, the display image of the liquid crystal panel, especially the display image in the large viewing angle direction, is reduced in the degree of ghost image, and the clarity of the image has been significantly improve.

13 Claims, 6 Drawing Sheets

(52) U.S. Cl.
CPC ............... *G02F 1/133553* (2013.01); *G02F 2001/133565* (2013.01); *G02F 2202/043* (2013.01)

(56) References Cited

U.S. PATENT DOCUMENTS

2019/0179190 A1* 6/2019 Chen .................. H01L 27/1218
2019/0353958 A1* 11/2019 Mitobe ............. G02F 1/133502

FOREIGN PATENT DOCUMENTS

| | | | | |
|---|---|---|---|---|
| CN | 104793281 A | | 7/2015 | |
| CN | 105093660 | | 11/2015 | |
| CN | 105866997 | | 8/2016 | |
| CN | 106353915 | | 1/2017 | |
| JP | 58-117524 | | 7/1983 | |
| JP | 2000098360 A | | 4/2000 | |
| JP | 2004133355 A | | 4/2004 | |
| KR | 10-2006-0046972 | | 5/2006 | |
| WO | WO 2007/052912 | * | 5/2007 | ........... G02F 1/1335 |
| WO | WO2007052912 | * | 5/2007 | ........... G02F 1/1335 |

* cited by examiner

LIQUID CRYSTAL PANEL AND MANUFACTURING METHOD FOR THE SAME

RELATED APPLICATIONS

The present application is a National Phase of International Application Number PCT/CN2018/084150, filed Apr. 24, 2018, and claims the priority of China Application No. 201810273077.4, filed Mar. 29, 2018.

FIELD OF THE INVENTION

The present invention relates to a display technology field, and more particularly to a liquid crystal panel and manufacturing method for the same.

BACKGROUND OF THE INVENTION

With the development of optoelectronics and semiconductor technology, the flat panel display (Flat Panel Display) has also been developed rapidly. Among many flat panel displays, liquid crystal displays (LCD) have high space utilization efficiency, low power consumption, no radiation and low electromagnetic interference and many other superior features such that the LCD has become the mainstream of the market.

As one of the liquid crystal displays, the reflective liquid crystal display has low power consumption, low cost, and a simple structure, and is therefore widely favored by consumers. FIG. 1 is a schematic structural diagram of a reflective liquid crystal display in the conventional art. With reference to FIG. 1, the reflective liquid crystal display of the conventional art sequentially includes a reflection sheet 11, a lower polarizer 12, an array substrate 13, a liquid crystal layer 14, a color filter substrate 15, and an upper polarizer 16.

FIG. 2 is an optical path diagram of a reflected light of the reflective liquid crystal display of FIG. 1. With reference to FIG. 2, the incident light sequentially passes through the upper polarizer 16, the color filter substrate 15, the liquid crystal layer 14, the array substrate 13, and the lower polarizer 12 to reach the reflection sheet 11, and reflected light is generated on the array substrate 13 and the reflection sheet 11. An image of the reflected light of the array substrate 13 is located at the point A, and an image of the reflected light of the reflection sheet 11 is located at the point B, and a gap between the points A and B is d1. Because the lower polarizer 12 has a larger thickness, the gap d1 is larger, so that blurring or ghosting may occur at a large viewing angle direction.

SUMMARY OF THE INVENTION

In order to solve the above problems in the prior art, an object of the present invention to provide a liquid crystal panel capable of reducing image ghosting and improving the sharpness of an image, and a manufacturing method for the same.

According to an aspect of the present invention, the present invention provides a liquid crystal panel, comprising: an array substrate, a color filter substrate, a liquid crystal layer, an internal polarizer, and an external polarizer; wherein the array substrate and the color filter substrate are aligned and assembled, and the liquid crystal layer and the internal polarizer are overlapped between the array substrate and the color filter substrate; and wherein the external polarizer is disposed on a side of the color filter substrate away from the array substrate.

Wherein the liquid crystal layer is disposed between the array substrate and the color filter substrate, the internal polarizer is disposed between the array substrate and the liquid crystal layer, or the internal polarizer is disposed between the liquid crystal layer and the color filter substrate.

Wherein the internal polarizer is made of a dichroic dye.

Wherein the dichroic dye includes an azo dye or a polycyclic dye.

Wherein the liquid crystal panel further includes a reflection sheet disposed at a side of the color filter substrate away from the array substrate.

Wherein the internal polarizer includes a soluble liquid crystal coating, and the soluble liquid crystal coating includes a sulfonic acid molecule having a rod-like supramolecular structure.

Wherein the sulfonic acid molecule includes at least one of an indanthrone group, a dibenzimidazole group, and a naphthalene group.

According to another aspect of the present invention, the present invention also provides a manufacturing method for a liquid crystal panel, comprising steps of: manufacturing an array substrate and a color filter substrate; manufacturing an internal polarizer on the array substrate or the color filter substrate; disposing the internal polarizer to face toward the color filter substrate or the array substrate in order to align and assemble the array substrate and the color filter substrate; filling a liquid crystal layer between the internal polarizer and the color filter substrate, or filling a liquid crystal layer between the internal polarizer and the array substrate; and disposing an external polarizer on a side of the color filter substrate away from the array substrate.

Wherein the step of manufacturing an internal polarizer on the array substrate or the color filter substrate includes steps of: coating a layer of polyvinyl alcohol film layer on the color filter substrate; irradiating the polyvinyl alcohol film layer such that the polyvinyl alcohol film layer is aligned in a fixed direction; and disposing a dichroic dye on the polyvinyl alcohol film layer being aligned in a fixed direction such that the dichroic dye is aligned in a fixed direction in order to form the internal polarizer.

Wherein the method further comprises a step of disposing a reflection sheet at a sides of the color filter substrate away from the array substrate.

Wherein the step of manufacturing an internal polarizer on the array substrate or the color filter substrate includes steps of: coating an aqueous solution of a soluble liquid crystal coating comprising a sulfonic acid molecule having a rod-like supramolecular structure on an array substrate or a color filter substrate; evaporating and removing water in the aqueous solution of the soluble liquid crystal coating; and using a roller structure to make the sulphonic acid-based molecule to be induced to be oriented and crystallized in order to form the internal polarizer.

The beneficial effect of the present invention: because the internal polarizer is disposed between the color filter substrate and the array substrate, the display image of the liquid crystal panel, especially the display image in the large viewing angle direction, is reduced in the degree of ghost image. At the same time, the clarity of the image has been significantly improved.

BRIEF DESCRIPTION OF THE DRAWINGS

Through following to combine figures to describe in detail, the above, the other purposes, the features and benefits of the exemplary embodiment of the present disclosure will become clearer, wherein.

DETAILED DESCRIPTION OF PREFERRED EMBODIMENTS

The following content combines with the drawings and the embodiment for describing the present invention in detail. However, many other forms can be used to implement the present invention. Besides, the present invention should not be interpreted to be limit in the specific embodiment described here. On the contrary, the embodiments provided here are used for explaining the operation principle and practical application such that person skilled in the art can under various embodiments of the present invention and various modification suitable for specific applications.

In the figures, in order to illustrate the devices clearly, thickness of the layers and regions are enlarged. A same numeral in the entire specification and figures represents a same device.

Figure 1:
FIG. 1 is a schematic structural view of a reflective liquid crystal display in the conventional art.
Figure 2:
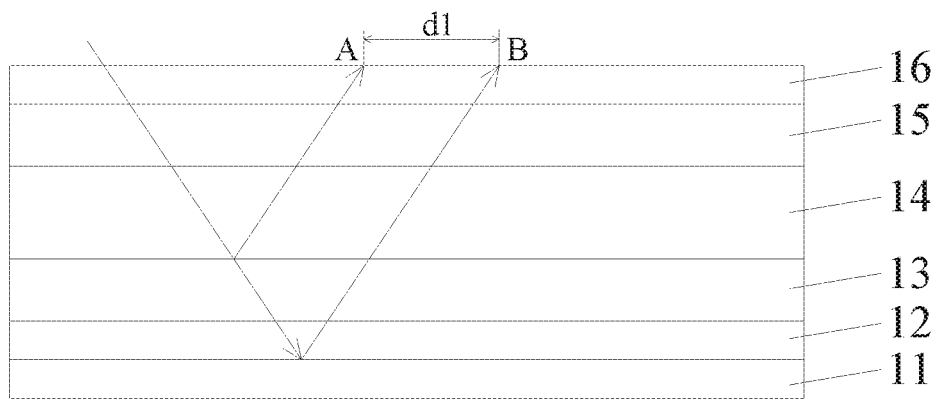
FIG. 2 is a light path diagram of a reflected light of the reflective liquid crystal display of FIG. 1.
Figure 3:
FIG. 3 is a schematic structural view of a liquid crystal panel according to a first embodiment of the present invention.

FIG. 3 is a schematic structural diagram of a liquid crystal panel according to a first embodiment of the present invention.

Referring to FIG. 3, the liquid crystal panel according to the first embodiment of the present invention includes an array substrate 100, a color filter substrate 200, a liquid crystal layer 300, an internal polarizer 400, an external polarizer 500, and a reflection sheet 600.

Specifically, the array substrate 100 and the color filter substrate 200 are aligned and assembled, and the liquid crystal layer 300 is sandwiched between the array substrate 100 and the color filter substrate 200. The internal polarizer 400 is disposed between the array substrate 100 and the liquid crystal layer 300, and the external polarizer 500 is disposed on a side of the color filter substrate 200 away from the array substrate 100. The reflection sheet 600 is disposed on a side of the array substrate 100 away from the color filter substrate 200.

In the present embodiment, the internal polarizer 400 may be formed of a dichroic dye, but the present invention is not limited thereto. Specifically, the dichroic dye includes an azo dye or a polycyclic dye, but the present invention is not limited thereto.

Figure 4:
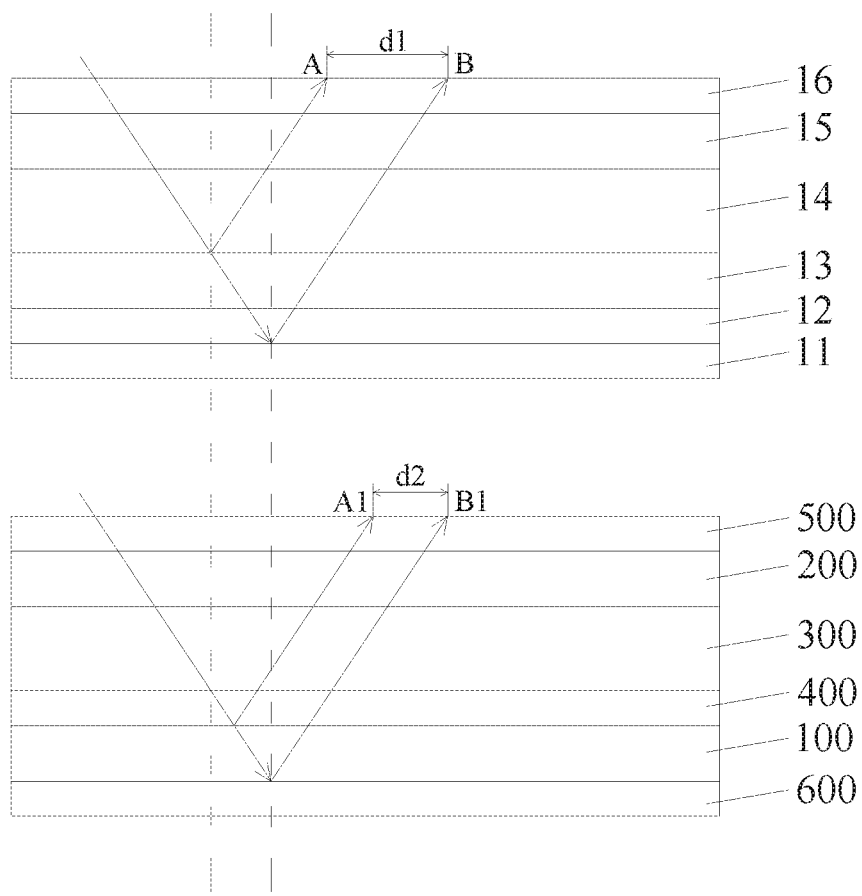
FIG. 4 is a comparison diagram of light paths of a reflected light of the liquid crystal panel according to a first embodiment and a reflected light of the liquid crystal panel of the conventional art.

FIG. 4 is an optical path comparison diagram of a reflected light of the liquid crystal panel and a reflected light of the prior art according to the first embodiment of the present invention.

With reference to FIG. 4, an upper diagram of FIG. 4 is a light path diagram of the reflected light of the liquid crystal panel in the prior art. Specifically, an incident light sequentially passes through the upper polarizer 16, the color filter substrate 15, the liquid crystal layer 14, the array substrate 13, and the lower polarizer 12 to reach the reflection sheet 11. A reflected light is generated on both of the array substrate 13 and the reflection sheet 11, wherein an image of the reflected light of the array substrate 13 is located at point A, and an image of the reflected light on the reflection sheet 11 is located at point B, a gap between the point A and the points B is d1.

The lower diagram of FIG. 4 is an optical path diagram of a reflected light of the liquid crystal panel according to the first embodiment of the present invention. Specifically, an incident light passes through the external polarizer 500, the color filter substrate 200, the liquid crystal layer 300, the internal polarizer 400, and the array substrate 100 to reach the reflection sheet 600. A reflective light is generated on both of the array substrate 100 and the reflection sheet 600. An image of the reflected light of the array substrate 100 is located at point A1, and an image of the reflected light on the reflection sheet 600 is located at point B1. A gap between the points A1 and B1 is d2

As shown in the upper and lower diagrams in FIG. 4, the gap d2 is smaller than the gap d1. Therefore, in the first embodiment according to the present invention, since the internal polarizer 400 is disposed between the liquid crystal layer 300 and the array substrate 100, the gap d2 is reduced, and the image ghost sensed by human eyes is not obvious. The sharpness of the image is higher, so that especially when viewing the display picture in a large viewing angle, there is inconspicuous image ghost, and the image sharpness is higher.

Figure 5:
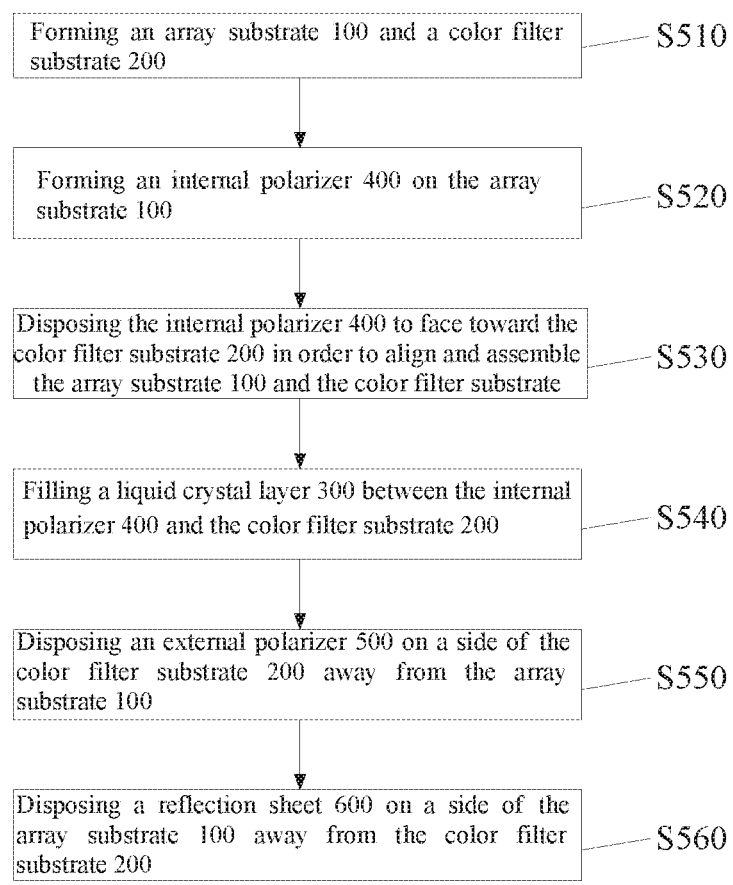
FIG. 5 is a flowchart of a manufacturing method for a liquid crystal panel according to a first embodiment of the present invention.

FIG. 5 is a flowchart of a manufacturing method for a liquid crystal panel according to a first embodiment of the present invention.

With reference to FIG. 3 and FIG. 5, a method for manufacturing a liquid crystal panel according to a first embodiment of the present invention includes a step S510 to a step S560.

Specifically, firstly, in the step S510, forming an array substrate 100 and a color filter substrate 200.

Next, in the step S520, forming an internal polarizer 400 on the array substrate 100.

Furthermore, the specific method for implementing the step S520 includes:

Step 1: coating a layer of polyvinyl alcohol film layer on the array substrate 100.

Step 2: irradiating the polyvinyl alcohol film layer such that the polyvinyl alcohol film layer is aligned in a fixed direction.

Step 3: disposing a dichroic dye on the polyvinyl alcohol film layer being aligned in a fixed direction such that the dichroic dye is aligned in a fixed direction in order to form the internal polarizer 400.

Next, in the step S530, disposing the internal polarizer 400 to face toward the color filter substrate 200 in order to align and assemble the array substrate 100 and the color filter substrate 200 together.

Next, in step S540, filling a liquid crystal layer 300 between the internal polarizer 400 and the color filter substrate 200. Wherein, the liquid crystal layer 300 includes several liquid crystal molecules.

Next, in the step S550, disposing an external polarizer 500 on a side of the color filter substrate 200 away from the array substrate 100.

Finally, in the step S560, disposing a reflection sheet 600 on a side of the array substrate 100 away from the color filter substrate 200.

Figure 6:
FIG. 6 is a schematic structural view of a liquid crystal panel according to a second embodiment of the present invention.

FIG. 6 is a schematic structural view of a liquid crystal panel according to a second embodiment of the present invention.

With reference to FIG. 6, a liquid crystal panel according to a second embodiment of the present invention includes an array substrate 100, a color filter substrate 200, a liquid crystal layer 300, an internal polarizer 400, an external polarizer 500, and a reflection sheet 600.

Specifically, the array substrate 100 and the color filter substrate 200 are assembled and aligned to form a cell box, and the liquid crystal layer 300 is sandwiched between the array substrate 100 and the color filter substrate 200. The internal polarizer 400 is disposed between the color filter substrate 200 and the liquid crystal layer 300, and the external polarizer 500 is disposed on a side of the color filter substrate 200 away from the array substrate 100. The reflection sheet 600 is disposed on a side of the array substrate 100 away from the color filter substrate 200.

In the present embodiment, the internal polarizer 400 may be formed of a dichroic dye, but the present invention is not limited thereto. Specifically, the dichroic dye includes an azo dye or a polycyclic dye, but the present invention is not limited thereto.

Figure 7:
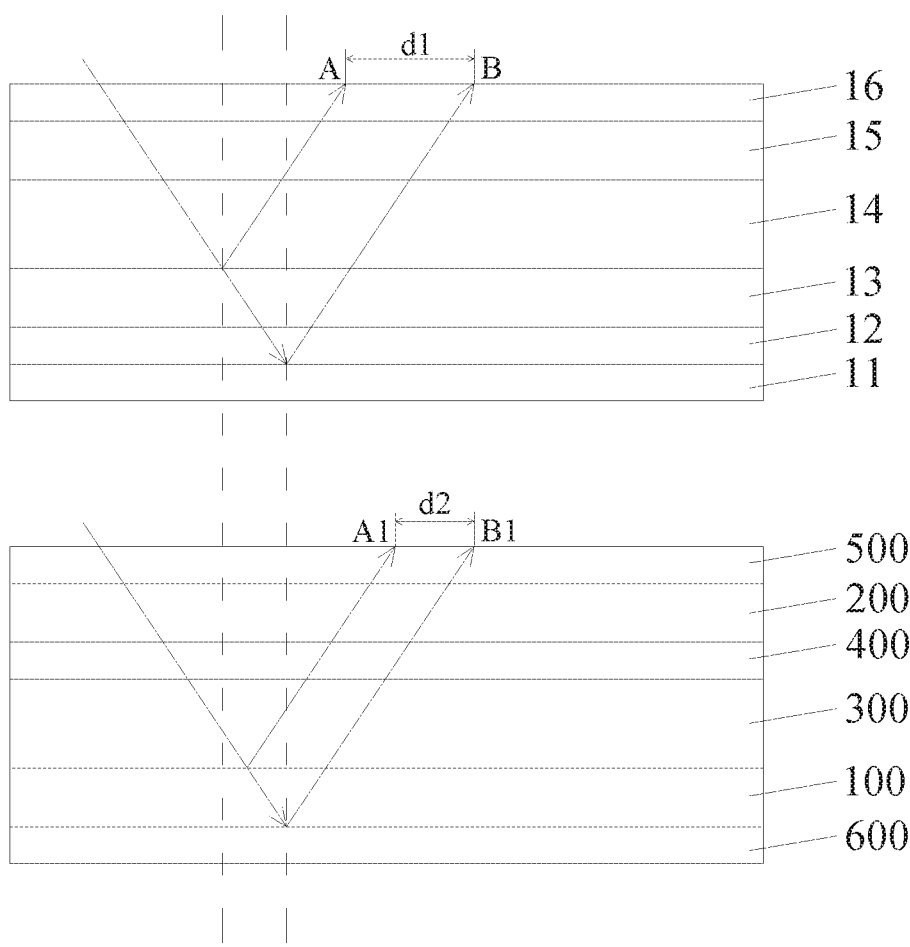
FIG. 7 is an optical path comparison diagram of a reflected light of the liquid crystal panel according to a second embodiment and a reflected light of the liquid crystal panel of the conventional art.

FIG. 7 is an optical path comparison diagram of a reflected light of the liquid crystal panel and a reflected light of the liquid crystal panel of the conventional art according to a second embodiment of the present invention.

With reference to FIG. 7, the upper diagram is an optical path diagram of a reflected light of the liquid crystal panel in the conventional art. Specifically, the incident light sequentially passes through the upper polarizer 16, the color filter substrate 15, the liquid crystal layer 14, the array substrate 13, and the lower polarizer 12 to reach the reflection sheet 11, a reflected light is generated on both the array substrate 13 and the reflection sheet 11. Wherein an image of the reflected light of the array substrate 13 is located at point A, and an image of the reflected light on the reflection sheet 11 is located at point B, a gap between the point A and the points B is d1.

The lower diagram is an optical path diagram of the reflected light of the liquid crystal panel according to the second embodiment of the present invention. Specifically, the incident light sequentially passes through the external polarizer 500, the color filter substrate 200, the internal polarizer 400, the liquid crystal layer 300, and the array substrate 100 to reach the reflection sheet 600. A reflective light is generated on both of the array substrate 100 and the reflection sheet 600. Wherein, an image of the reflected light of the array substrate 100 is located at point A1, and an image on the reflected light of the reflection sheet 600 is located at point B1. A gap between points A1 and B1 is d2.

As shown in the upper and lower diagrams in FIG. 7, the gap d2 is smaller than the gap d1. Therefore, in the second embodiment according to the present invention, since the internal polarizer 400 is disposed between the liquid crystal layer 300 and the color filter substrate 200, the gap d2 is reduced, and the image ghost sensed by human eyes is not obvious. The sharpness of the image is higher, so that especially when viewing the display picture in a large viewing angle, there is inconspicuous image ghost, and the image sharpness is higher.

Figure 8:
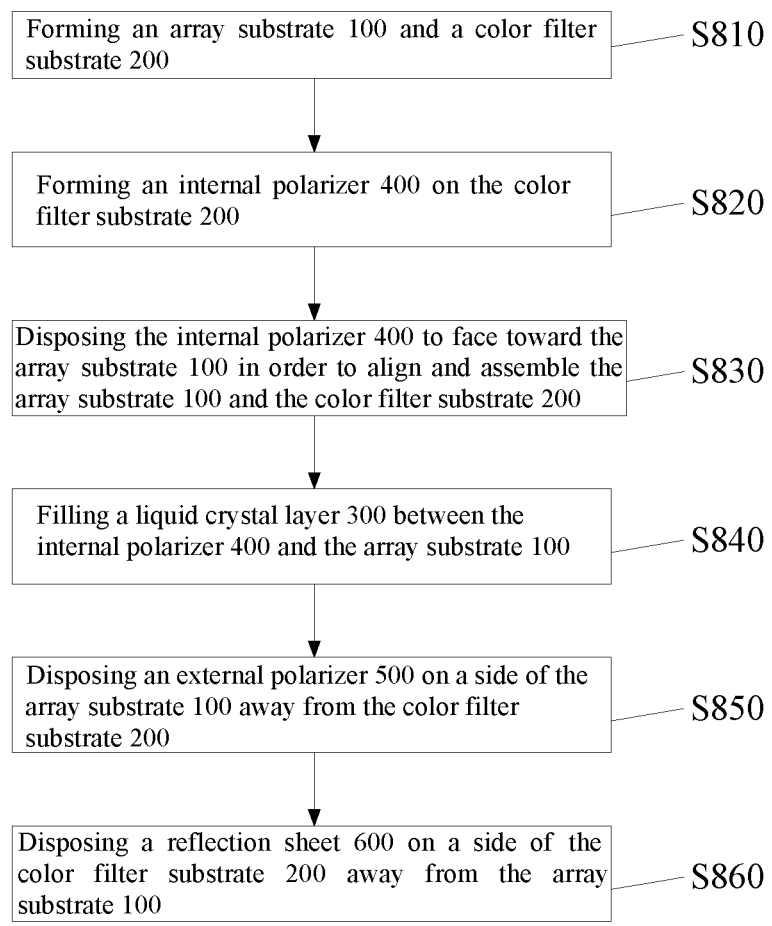
FIG. 8 is a flowchart of a manufacturing method of the liquid crystal panel according to a second embodiment of the present invention.

FIG. 8 is a flowchart of a method of a manufacturing method for a liquid crystal panel according to a second embodiment of the present invention.

With reference to FIG. 6 and FIG. 8, a method for manufacturing a liquid crystal panel according to a second embodiment of the present invention includes steps S810-S860.

Specifically, firstly, in the step S810, forming an array substrate 100 and a color filter substrate 200.

Next, in the step S820, forming an internal polarizer 400 on the array substrate 100.

Furthermore, the specific method for implementing the step S820 includes:

Step 1: coating a layer of polyvinyl alcohol film layer on the color filter substrate 200.

Step 2: irradiating the polyvinyl alcohol film layer such that the polyvinyl alcohol film layer is aligned in a fixed direction.

Step 3: disposing a dichroic dye on the polyvinyl alcohol film layer being aligned in a fixed direction such that the dichroic dye is aligned in a fixed direction in order to form the internal polarizer 400.

Next, in the step S830, disposing the internal polarizer 400 to face toward the array substrate 100 in order to align and assemble the array substrate 100 and the color filter substrate 200 together.

Next, in step S840, filling a liquid crystal layer 300 between the internal polarizer 400 and the array substrate 100. Wherein, the liquid crystal layer 300 includes several liquid crystal molecules.

Next, in the step S850, disposing an external polarizer 500 on a side of the array substrate 100 away from the color filter substrate 200.

Finally, in the step S860, disposing a reflection sheet 600 on a side of the color filter substrate 200 away from the array substrate 100.

In addition, as another embodiment of the present invention, the internal polarizer 400 includes a highly-aligned soluble liquid crystal coating that includes a sulfonic acid molecule having a rod-like supramolecular structure. In addition, the sulfonic acid molecules may also include different groups for different colors of light. For example, for UV light, the sulfonic acid molecules may also include an indanthrone group; for red light, the sulfonic acid molecules may also include indanthrone group and dibenzimidazole group; and for blue light, the sulfonic acid molecule may also include a naphthalene group. That is, the sulfonic acid molecule may include at least one of an indanthrone group, a dibenzimidazole group, and a naphthalene group.

As an embodiment of the present invention, the molecular structure of the sulfonic acid molecule is as follows:

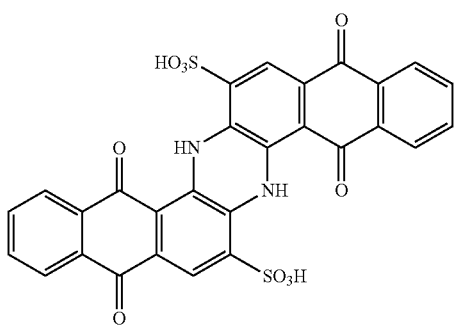 [SMILES: O=c1c2ccccc2c(=O)c2c1cc(S(=O)(=O)O)c1[nH]c3c([nH]c12)c(S(=O)(=O)O)cc1c(=O)c2ccccc2c(=O)c13]

Further, as another embodiment of the present invention, a specific method for manufacturing the internal polarizer 400 may also be:

Step 1: coating an aqueous solution of a soluble liquid crystal coating comprising a sulfonic acid molecule having a rod-like supramolecular structure on an array substrate 100 (corresponding to the first embodiment of the present invention) or a color filter substrate 200 (corresponding to the second embodiment of the present invention).

Here, since sulfonic acid molecules having a rod-like supramolecular structure contain a flat, ellipsoidal stacked structure. A hydrophobic group in a sulfonic acid molecule having a rod-like supramolecular structure forms a "head-to-head" stack, and a hydrophilic group is exposed around water molecule. The mutual repulsion of the charge between the molecular groups can also prevent the clusters among molecular. After that, a sulfonic acid molecule having a rod-like supramolecular structure in an aqueous solution of a soluble liquid crystal coating is deposited on the bottom, and a 300-500 nm film structure can be formed.

In addition, the mass ratio of the sulfonic acid molecules of the soluble liquid crystal coating in the aqueous solution is 3% to 21%. Sulfonic acid molecules exhibit a long columnar structure due to the interaction between molecules, and the aspect ratio exceeds 100:1. The internal polarizer has a good polarizing effect and can improve the viewing angle of the negative liquid crystal.

Step 2: evaporate and removing water in the aqueous solution of the soluble liquid crystal coating.

Figure 9:
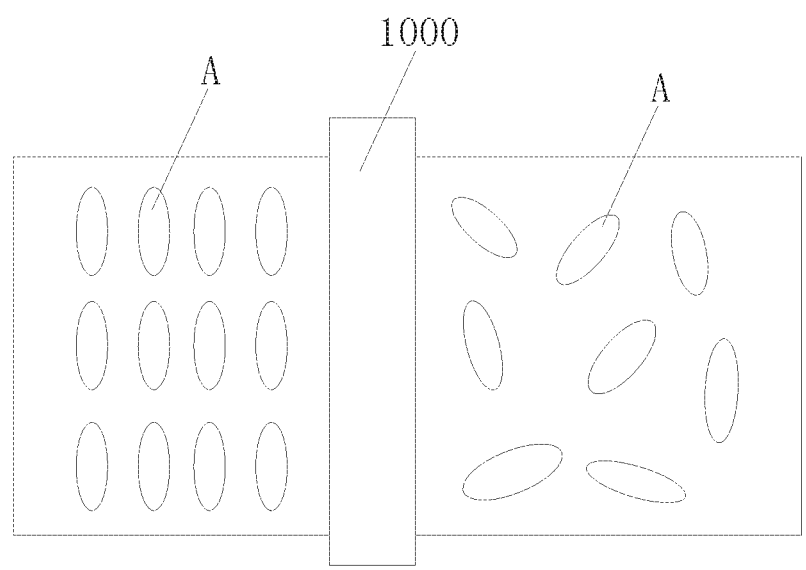
FIG. 9 is a schematic view of induced crystallization of a sulfonic acid molecule using a roller structure according to an embodiment of the present invention.

Step 3: As shown in FIG. 9, using a roller structure 1000 to make the sulphonic acid-based molecule A to be induced to be oriented and crystallized in order to form the internal polarizer 400. Wherein, in FIG. 9, the left sulfonic acid molecule A has been induced to be crystallized, and the right sulfonic acid molecule A has not been induced to be crystallized.

In summary, the liquid crystal panels according to the embodiments of the present invention can reduce the degree of ghost image, and increase the clarity of the image.

The above embodiments of the present invention are only exemplary, however, the present invention is not limited. The person skilled in the art can understand: without exceeding the principle and spirit of the present invention, the above embodiments can be improved, wherein, the scope of the present invention is limited in the claims and the equivalents of the claims.

What is claimed is:

1. A liquid crystal panel, comprising:
an array substrate, a color filter substrate, a liquid crystal layer, an internal polarizer, and an external polarizer;
wherein the array substrate and the color filter substrate are aligned and assembled, and the liquid crystal layer and the internal polarizer are overlapped between the array substrate and the color filter substrate; and
wherein the external polarizer is disposed on a side of the color filter substrate away from the array substrate;
wherein the internal polarizer includes a soluble liquid crystal coating, and the soluble liquid crystal coating includes a sulfonic acid molecule having a rod-like supramolecular structure.

2. The liquid crystal panel according to claim 1, wherein the liquid crystal layer is disposed between the array substrate and the color filter substrate, the internal polarizer is disposed between the array substrate and the liquid crystal layer, or the internal polarizer is disposed between the liquid crystal layer and the color filter substrate.

3. The liquid crystal panel according to claim 1, wherein the internal polarizer is made of a dichroic dye.

4. The liquid crystal panel according to claim 2, wherein the internal polarizer is made of a dichroic dye.

5. The liquid crystal panel according to claim 3, wherein the dichroic dye includes an azo dye or a polycyclic dye.

6. The liquid crystal panel according to claim 4, wherein the dichroic dye includes an azo dye or a polycyclic dye.

7. The liquid crystal panel according to claim 1, wherein the liquid crystal panel further includes a reflection sheet disposed at a side of the array substrate away from the color filter substrate.

8. The liquid crystal panel according to claim 2, wherein the liquid crystal panel further includes a reflection sheet disposed at a side of the array substrate away from the color filter substrate.

9. The liquid crystal panel according to claim 2, wherein the internal polarizer includes a soluble liquid crystal coating, and the soluble liquid crystal coating includes a sulfonic acid molecule having a rod-like supramolecular structure.

10. The liquid crystal panel according to claim 1, wherein the sulfonic acid molecule includes at least one of an indanthrone group, a dibenzimidazole group, and a naphthalene group.

11. The liquid crystal panel according to claim 9, wherein the sulfonic acid molecule includes at least one of an indanthrone group, a dibenzimidazole group, and a naphthalene group.

12. A manufacturing method for a liquid crystal panel, comprising steps of:
manufacturing an array substrate and a color filter substrate;
manufacturing an internal polarizer on the array substrate or the color filter substrate;
disposing the internal polarizer to face toward the color filter substrate or the array substrate in order to align and assemble the array substrate and the color filter substrate;
filling a liquid crystal layer between the internal polarizer and the color filter substrate, or filling a liquid crystal layer between the internal polarizer and the array substrate; and
disposing an external polarizer on a side of the color filter substrate away from the array substrate;
wherein the step of manufacturing an internal polarizer on the array substrate or the color filter substrate includes steps of:
coating an aqueous solution of a soluble liquid crystal coating comprising a sulfonic acid molecule having a rod-like supramolecular structure on an array substrate or a color filter substrate;
evaporating and removing water in the aqueous solution of the soluble liquid crystal coating; and using a roller structure to make the sulphonic acid-based molecule to be induced to be oriented and crystallized in order to form the internal polarizer.

13. The manufacturing method for a liquid crystal panel according to claim 12, wherein the step of manufacturing an internal polarizer on the array substrate or the color filter substrate includes steps of:

coating a layer of polyvinyl alcohol film layer on the color filter substrate;

irradiating the polyvinyl alcohol film layer such that the polyvinyl alcohol film layer is aligned in a fixed direction; and disposing a dichroic dye on the polyvinyl alcohol film layer being aligned in a fixed direction such that the dichroic dye is aligned in a fixed direction in order to form the internal polarizer.

* * * * *